Patented Jan. 11, 1927.

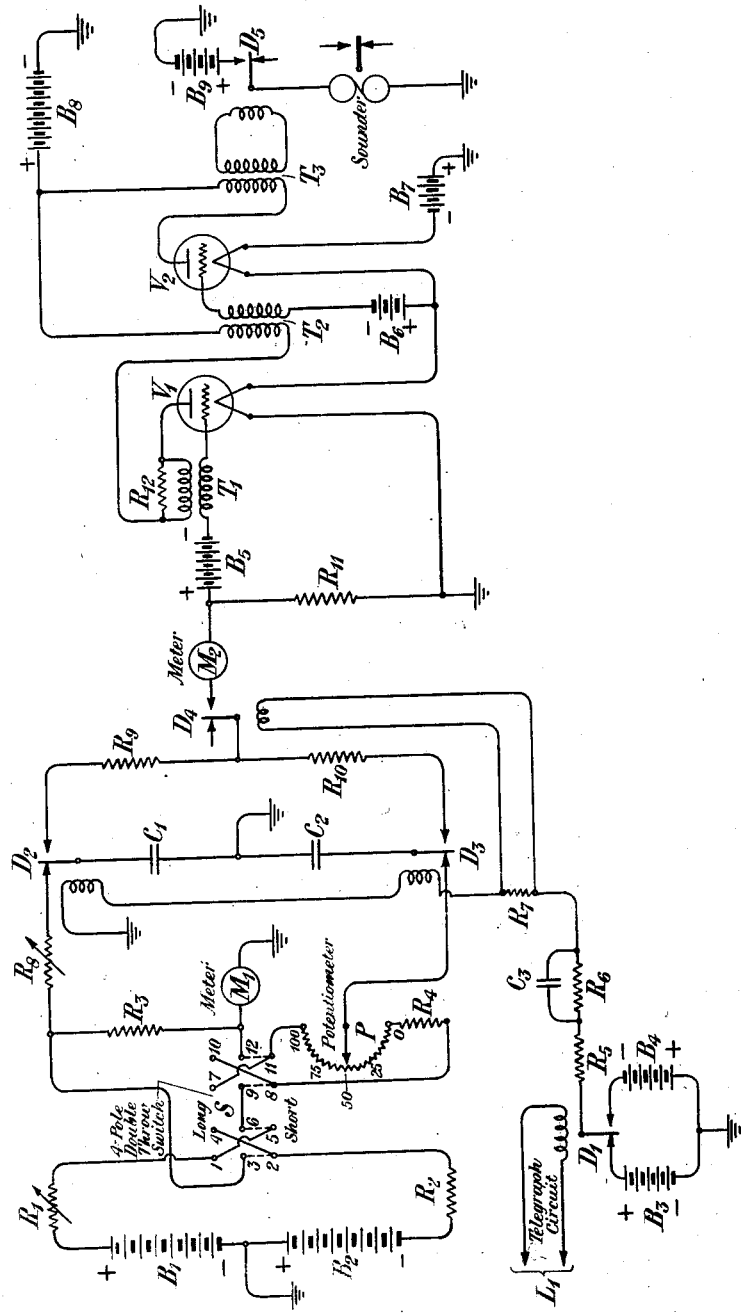

1,613,704

UNITED STATES PATENT OFFICE.

JOSEPH HERMAN, OF NEW YORK, N. Y., ASSIGNOR TO AMERICAN TELEPHONE AND TELEGRAPH COMPANY, A CORPORATION OF NEW YORK.

TELEGRAPH-DISTORTION MEASURING SYSTEM.

Application filed November 14, 1924. Serial No. 749,991.

This invention relates to the measurement of the magnitude of distortion of telegraph signals resulting from their transmission over line circuits, and particularly to a method and means for a rapid measurement of the various components of such distortion. This invention is specially directed to the quantitative determination of that form of distortion manifesting itself in the lengthening or shortening of the period of duration of the transmitted signal.

Heretofore the amount of distortion has sometimes been determined by ear, a good operator being able to detect the difference between good signals and those designated as unsteady or biased. Another means for determining the magnitude of distortion is the Wheatstone receiver. By means of this device which has been employed to a great extent and is satisfactory when moderate accuracy only is desired, the length of a dot made on a tape moving with uniform velocity is measured and compared with the length of an undistorted dot. This arrangement has limitations which render it undesirable, particularly in making routine tests.

The principal object of this invention is to measure rapidly the various components of telegraph distortion. For a clear understanding of this invention, distortion may be considered as being made up of three components, (1) symmetric distortion, (2) asymmetric distortion or bias, and (3) fortuitous distortion. For most measuring purposes, the first two components may be grouped together and designated systematic distortion which is the distortion of the average of a large number of successive signals. This distortion is a function of the constants of the telegraph system. The third component, namely, fortuitous distortion, varies from signal to signal and is equal to the actual distortion for any individual signal minus the average distortion of a large number of signals. This component is due to interference and accidental variations in the telegraph apparatus. My invention combines various features of distortion bridges for measuring systematic distortion with an accurate means for measuring fortuitous distortion.

Another object of this invention is to determine the frequency of occurrence of distortions which are greater than a certain given value.

This invention will be clearly understood from the following description read in connection with the attached drawing showing schematically a form of embodiment of the invention.

Batteries $B_1$ and $B_2$, which are of substantially equal voltage, are connected to ground in the manner shown in the drawing so as to apply voltages of opposite polarity to the grounded condensers $C_1$ and $C_2$, the purpose of doing which will be clear from a later description. The positive pole of battery $B_1$ and the negative pole of $B_2$ are connected through the resistances $R_1$ and $R_2$, respectively, with contacts 1 and 2, respectively, of the four-pole double-throw switch S. The contacts of the switch are so connected that when the blades are thrown from one set of contacts to the opposite set the circuit connections are reversed. The contact 3 of this switch is connected to ground through the resistance $R_3$ and the meter $M_1$ and is also connected to ground through the resistance $R_8$ and the condenser $C_1$ whenever the armature of the relay $D_2$ is upon its left-hand contact. Contact 8 of the switch S is connected to ground through the resistance $R_4$, the winding of the potentiometer P and the meter $M_1$ (when the switch blades are in their lower position), and it is also connected to ground through the resistance $R_4$, a part of the potentiometer P and the condenser $C_2$ when the armature of the relay $D_3$ is upon its left-hand contact. With the blades thrown downward as represented by the dotted lines connecting the contacts of the switch S, battery $B_1$ will cause current to flow through resistance $R_1$, contacts 1, 5, 6, 9 and 8 of switch S, the resistance $R_4$ and the potentiometer P, contacts 11 and 12 of switch S and meter $M_1$ to ground. If the armature of relay $D_3$ is upon its left-hand contact, current will also flow from the contact point of the potentiometer P, through the contact of relay $D_3$ and condenser $C_2$ to ground, thus charging the condenser. In similar manner, current will flow from battery $B_2$, through resistance $R_2$, contacts 2 and 3 of switch S and resistance $R_3$ to ground. Current will also flow from the same battery through resistance $R_8$ and condenser $C_1$ to ground. Resistance $R_4$ is equal in magnitude to potentiometer P, and the sum of $R_4$ and P is equal in magnitude to $R_3$. Because of the latter equality, the voltages across $R_3$ and $R_4+P$ will be equal and opposite, provided $R_1$ is equal to $R_2$, and $B_1$ and $B_2$ have equal voltages. In the event that these voltages are not equal, the variable resistance $R_1$ may be adjusted to compensate for the difference. The equality of voltages across $R_3$ and $R_4+P$ is then indicated by a zero reading on the meter $M_1$. The right-hand contacts of relays $D_2$ and $D_3$ are connected with terminals of resistances $R_9$ and $R_{10}$, respectively, the other terminals of which are connected with the armature of the relay $D_4$. The right-hand contact of this relay is connected through the meter $M_2$ with the grid circuit of the tube $V_1$ which is a regenerative detector. This circuit includes the negative biasing battery $B_5$ and the winding of the transformer $T_1$ through which a certain amount of energy is fed back from the plate circuit of the tube. A resistance $R_{11}$ is connected to ground between the junction point of the meter $M_2$ and the battery $B_5$. The plate circuit of the tube $V_1$ includes the battery $B_8$, a winding of the transformer $T_2$, and a winding of the transformer $T_1$, the latter being shunted by the resistance $R_{12}$. The tube $V_2$, which acts as an amplifier, has its input coupled with the plate circuit of the tube $V_1$ by the transformer $T_2$. The grid of this tube is biased negatively by the battery $B_6$. The filaments of both tubes are energized by the battery $B_7$. The plate circuit of the tube $V_2$ is connected by the transformer $T_3$ with the winding of the relay $D_5$, the armature of which is connected with a sounder or other indicating device. The telegraph circuit $L_1$ is connected with the winding of the relay $D_1$, the armature of which swings between contacts connected with the batteries $B_3$ and $B_4$ of opposite polarity which are the sources for energizing relays $D_2$, $D_3$ and $D_4$. The armature of relay $D_1$ is connected through resistances $R_5$, $R_6$ and $R_7$ with the windings of relays $D_2$ and $D_3$. The winding of relay $D_4$ is shunted across resistance $R_7$ so that that relay will lag slightly with respect to the relays $D_2$ and $D_3$ in its operation. The purpose of this lag is to eliminate the effect of differences in armature travel time and to allow the charges on condensers $C_1$ and $C_2$ to combine and to reach a steady condition before the combining circuit is connected to the detector and amplifier. The resistances $R_5$ and $R_6$ are to limit the current through the polar relays and the condenser $C_3$ which shunts $R_6$ is designed to render the wave front of the energizing current more abrupt. The windings of the polar relays are so connected that the armatures of the relays rest on their left-hand contacts, as shown on the drawing, during the interval of the dots or spaces whose length is to be measured. The condensers $C_1$ and $C_2$ will thus become charged. The condenser $C_1$ will acquire a gradual charge owing to the fact that its charging current has to flow through the high resistance $R_8$. The total charge on this condenser depends upon the time interval during which charging takes place, and the amount of charge is therefore an accurate indication of the dot length which is being measured. The condenser $C_2$ is charged almost instantly to the voltage determined by the setting of the potentiometer P, because the resistance of P and $R_4$ combined is comparatively small. At the end of the dot or space signal, the armatures of relays $D_2$ and $D_3$ move to their right-hand contacts, and the charges of opposite polarity on condensers $C_1$ and $C_2$ combine by flowing through resistances $R_9$ and $R_{10}$. If the two charges are equal, the condensers will be entirely discharged. In that case, no current will flow through the meter $M_2$ and resistance $R_{11}$ to ground when later the armature of relay $D_4$ moves to its right-hand contact. If the charges are not equal, current will flow through the meter which will indicate the fact that the length of signal is different from that represented by the setting of the potentiometer.

In order to measure systematic distortion, as defined hereinbefore, it is necessary to calibrate the apparatus so that the potentiometer P will represent in terms of per cent distortion the magnitude of the residual charge that flows through the meter M to ground after the operation of the relay $D_4$. This calibration may be done either experimentally or mathematically.

Experimental calibration.

Any type of signal containing only dots of unit length might be used for this purpose but for the sake of simplicity assume that the signal is the well known "E" signal which consists of a single dot followed by a much longer space. The signal should be obtained from a mechanical interrupter which is driven by a motor. The latter should be provided with an adjustable governor which is set near the middle of its range so as to be adjustable in either direction.

The recurring signal thus obtained is connected to the measuring set and operates the relays. With the potentiometer P on the point marked 0, namely, the junction point between the potentiometer and the resistance $R_4$, the resistance $R_8$ is adjusted until the charges on the condensers $C_1$ and $C_2$ are equal. This condition is indicated by a lack of deflection in meter $M_2$. The speed of revolution of the motor is then counted and the dot length of the signal which will be called the "true dot length" is calculated.

Other points on the potentiometer P corresponding to distorted signals may now be obtained by increasing the speed of the motor so as to decrease the dot length and adjusting the potentiometer P until the meter $M_2$ again reads 0. The dot length for the new speed is calculated and the difference between this dot length and the original or "true" dot length expressed as a percentage of the true dot length is marked on the scale of the potentiometer P. Other points representing dot lengths shorter than the true dot length may be obtained in a similar manner.

For positive distortions, that is, dot lengths longer than the true dot length, the switch S is thrown to the "long" position. This reverses the batteries $B_1$ and $B_2$ and also interchanges the relative positions of P and $R_4$. The reversing of the batteries is not important in this connection but the reversing of P with $R_4$ is necessary. The latter operation causes the voltage applied to condenser $C_2$ to be increased with a movement of the potentiometer contact from its zero position while in the previous case the voltage was decreased. The reason for this change is obvious when it is remembered that the charge on condenser $C_1$ will be greater as the signals are lengthened and consequently the voltage applied to condenser $C_2$ must be greater to neutralize the charge.

With switch S thrown as indicated above, the potentiometer may be calibrated for various positive distortions in a manner similar to that for negative distortions. It will, of course, be necessary to have two scales on the potentiometer, one which reads negative distortions and the other which reads positive distortions. The position of switch S will determine which scale is to be read.

It should be noted that the timing resistance $R_s$ is not readjusted during calibration, after having once been set for the true dot length. When making measurements at speeds other than that used in calibrating the potentiometer, the resistance $R_s$ must be readjusted. It is, therefore, necessary to have a curve or table which gives the value of $R_s$ to be used with a particular speed of signaling or true dot length. Such a curve may be obtained experimentally by setting the potentiometer P on 0 and determining the value of timing resistance $R_s$ required to make the condenser charges neutralize each other for various speeds of signaling.

It should also be noted that the distortion calibrations on the potentiometer P hold for all speeds of signaling provided the timing resistance $R_s$ is adjusted to the proper value for that particular speed. This will be evident by an inspection of the equation representing the charging curve of a condenser in series with a resistance.

The equation is as follows:

$$q = Q(1 - \epsilon^{-\frac{t}{CR}}) \quad (1)$$

where $q$ = charge at time $t$.
$Q$ = final or maximum charge of the condenser.
$t$ = time elapsed since the charging began.
$C$ = capacity of condenser.
$R$ = resistance in series with condenser.
$\epsilon$ = base of Naperian logarithms.

As applied to the measuring set, C and Q are constant, while $q$, $t$ and R are variable. Let the true dot length during calibration be represented by $T'$ and the true dot length for any other speed after calibration by $T''$. Let the charges and timing resistances for the true dot lengths for these conditions be represented by $q'$ $q''$ and $R'$ $R''$, respectively. As pointed out above the potentiometer P is set on zero when determining the timing resistances $R'$ and $R''$ for the true dot lengths in the two cases, therefore $$q' = q'' \quad (2)$$

or $$Q(1 - \epsilon^{-\frac{T'}{CR'}}) = Q(1 - \epsilon^{-\frac{T''}{CR''}}) \quad (3)$$

or $$\frac{T'}{R'} = \frac{T''}{R''} \quad (4)$$

If a point on the potentiometer has been calibrated for any distortion such as $d$, it means that the dot length for that particular distortion was $(1 \pm d) T'$, in terms of the true dot length $T'$. The sign of $d$ depends upon whether the distortion was positive or negative. Similarly for any other speed in which the true dot length is $T''$, this same value of distortion would give a dot length of $(1 \pm d) T''$. It is evident from equation (4) that multiplying $T'$ and $T''$ by $(1 \pm d)$ does not destroy the equation. Therefore, the calibration of the potentiometer in per cent. distortion at one speed, using a timing resistance $R'$, holds true for any other speed provided the proper timing resistance $R''$ is chosen for that speed.

*Mathematical calibration.*

In some cases where the experimental method of calibrating the measuring set is not found practicable, a mathematical method may be used. Such a method will now be derived and described. The notation on the drawing forming part of this application will be used for the various values of resistance and capacity and substitutions will be made in the fundamental equation (1). The charges $q$ and $Q$ may be replaced by:

$$q = C_2 e = C_2 r_p I' \text{ and } Q = C_1 E = C_1 R_3 I''. \quad (5)$$

Where $r_p$ = potentiometer resistance between contact of potentiometer P and ground.
$I'$ = current in potentiometer circuit.
$I''$ = current in resistance $R_3$.

If the batteries $B_1$ and $B_2$ are balanced so that meter $M_1$ reads zero then $I' = I''$ and equations (5) become:

$$q = C_2 r_p I' \text{ and } Q = C_1 R_3 I' \quad (6)$$

Let T be the undistorted or true dot length corresponding to the zero setting of the potentiometer P and let $\pm d$ be the distortion reading for any point on the potentiometer. Then the length of the distorted dot will be:

$$t = (1 \pm d) T. \quad (7)$$

Substituting equations (6) and (7) in equation (1) and replacing R by $R_s$ gives:

$$\frac{C_2 r_p}{C_1 R_3} = 1 - \epsilon^{\frac{-(1 \pm d)T}{C_1 R_s}} \quad (8)$$

Since the values of T, $C_1$ and $R_s$ are constant for all values of $d$ during calibration.

$$\frac{T}{C_1 R_s} = K \quad (9)$$

Equation (8) then becomes:

$$\frac{C_2 r_p}{C_1 R_3} = 1 - \epsilon^{-(1 \pm d)K} \quad (10)$$

It will probably be desirable to make condensers $C_2$ and $C_1$ equal. If this is done equation (10) reduces to $$\frac{r_p}{R_3} = 1 - \epsilon^{-(1 \pm d)K} \quad (11)$$

The constant K may be obtained from the constants of the measuring set for the condition of zero distortion. In this case $d = $ zero, and $r_p = P$, the resistance of the potentiometer.

Having found the value of K, the setting of the potentiometer P, so as to include a potentiometer resistance $r_p$ between the potentiometer contact and ground, may be found by giving various positive and negative values of distortion to $d$ and solving equation (10) or (11). In this way as many points as desired may be found and the potentiometer may be accurately calibrated. A good Wheatstone bridge should be used in finding the different values of $r_p$ on the potentiometer.

The values of the timing resistance $R_s$ for different speeds of signaling may be found from equation (9) after the constant K has been found. This equation may be rearranged as follows:

$$R_s = \frac{T}{C_1 K} \quad (12)$$

Since the values of $C_1$ and K are known, various values of $R_s$ corresponding to different speeds of signaling or true dot lengths T, may readily be obtained. Having once calibrated the set, it requires no further calibration unless the values of capacity and resistance in the measuring circuit should change. Since such changes can readily be avoided by using properly constructed condensers and resistances, it is evident that the arrangement will give accurate and reliable results over a long period of time. Frequent checking of the balance of batteries $B_1$ and $B_2$ is necessary in this connection and means should be provided for doing this accurately.

The foregoing description shows the method for obtaining the systematic distortion which, as stated, includes not only the symmetric distortion, but also the asymmetric distortion of bias.

In order to separately determine the magnitudes of these components, the following method should be used. A normal signal is sent over the telegraph circuit $L_1$ in the usual manner and received on the measuring set at the receiving station. The potentiometer P is adjusted until the meter $M_2$ reads zero. The position of the pointer on the potentiometer scale shows the average systematic distortion, that is, the symmetric distortion plus the bias. A reverse signal is then sent from the sending station, and the batteries $B_3$ and $B_4$ on the contacts of the master relay $D_1$ are reversed so that the polar relays will again operate properly. The distortion is again measured by the setting of the potentiometer P. This reading represents the symmetric distortion minus bias. It will, of course, be apparent that from these two readings the magnitudes of the symmetric distortion and bias can readily be calculated. In order to obtain accurate results, it is necessary that the voltages of batteries $B_1$ and $B_2$ shall be balanced, that the proper value of the timing resistance $R_s$ shall be used, and that a constant speed interrupter shall be used to insure uniform dot lengths.

*Measurement of maximum distortion.*

In the measurement of systematic distortion and its components, the description of which has just been given, it is not necessary to use the vacuum tube detector-amplifier shown upon the drawing. The value of this apparatus is found in the measurement of maximum distortion. The manner in which this apparatus functions is as follows:

The first tube, $V_1$, acts somewhat like a regenerative detector. The unneutralized discharge currents from condensers $C_1$ and $C_2$ flow through resistance $R_{11}$, and the voltage drop across this resistance is impressed on the grid of the tube. The negative grid battery $B_5$ has a large enough voltage so that negative discharges of the condensers have no effect in the plate circuit of the tube, only positive discharges produce any effect.

Transformer $T_1$ acts as a feed-back transformer to amplify the increase in plate current due to positive discharges of the condensers. A resistance $R_{12}$ is shunted across the primary winding of this transformer to limit the feed-back effect and to prevent continuous oscillations. The feed-back arrangement may be dispensed with and replaced with additional stages of amplification where such a change is found desirable.

Coupling between the first and second tubes is accomplished by means of transformer $T_2$, which has its primary winding connected in series with that of $T_1$ in the plate circuit of the detector tube $V_1$. The output of the second tube $V_2$ is stepped down to a lower voltage by means of transformer $T_3$ and operates the polar relay $D_5$. The relay operating current, which is obtained in this manner, consists of a positive and a negative impulse of current for each positive condenser discharge through resistance $R_{11}$. This is due to the action of the transformer $T_3$. As a result, the armature of relay $D_5$ moves from its spacing contact to its marking contact and back to its spacing contact for each discharge impulse. The sounder connected to the relay armature will, therefore, give one click for each positive discharge impulse.

Assume that it is desired to measure the maximum negative distortion of signals. The circuit arrangement is then exactly as shown on the drawing. The positive battery $B_1$ is connected to potentiometer $P$ and the negative battery $B_2$ to the timing resistance $R_8$. As a result, the condenser $C_2$ will get a positive charge and the condenser $C_1$ a negative charge.

If the potentiometer $P$ is set at any particular value of distortion, the condenser $C_2$ will get a definite positive charge for each dot. This charge will be practically constant for all dot lengths, even for extremely short dots. The condenser $C_1$ will get a negative charge whose value will depend on the particular length of the dot during which the condenser is charged. It is evident that the positive charge on $C_2$ may be decreased sufficiently, by adjusting the potentiometer, so that condenser $C_1$ will always have an excess negative charge. Since only an excess positive charge operates the sounder at the output of the detector-amplifier, the maximum negative distortion is obtained by adjusting the potentiometer to the point where the sounder just fails to operate. The value of this distortion is then read directly on the negative scale of the potentiometer.

For positive distortions the switch $S$ is thrown to the "long" position. This reverses the batteries $B_1$ and $B_2$ so that $C_2$ gets a negative charge and $C_1$ a positive charge. Adjusting the potentiometer in this case increases the negative charge on $C_2$ until it exceeds the positive charge on $C_1$, even for the longest dots. The point at which this condition occurs is observed by the failure of the sounder to operate and the value of distortion is read on the positive scale of the potentiometer.

To separate the maximum fortuitous distortion from the systematic distortion and bias, it is only necessary to subtract the average distortion obtained previously from the maximum distortions obtained above. If the maximum distortions were obtained from the normal signal, the corresponding average distortion should be used and vice versa for a reversed signal.

For certain classes of measurements, where large distortions occur at infrequent intervals, the sounder may be provided with contacts and made to operate a counting device such as a message register. In this case, the potentiometer $P$ is set at any desired value of distortion. Whenever the distortions exceed the setting of the potentiometer, a record will be made on the message register. In this way an accurate record of the operation of a telegraph circuit during a long period of time may be obtained with very little effort.

What is claimed is:

1. The method of measuring distortion of telegraph signals, which consists in charging two condensers from a direct current source and determining the magnitude of the distortion of the signal by the difference in the charges taken by the said condensers.

2. The method of measuring distortion of telegraph signals which consists in charging two condensers during the time in which a telegraph signal keeps the circuits of the condensers closed, combining the charges and measuring the resultant charge.

3. The method of measuring distortion of telegraph signals which consists in charging a condenser and limiting the rate of charging, charging another condenser without any limitation upon its charging rate, and comparing the two charges thus produced.

4. In a telegraph distortion measuring system the combination with a source of signals to be measured, of a plurality of condensers, a source of potential individual to each condenser, a resistance in series with one of said condensers, switching means to combine the charges upon the condensers, and means to measure the combined charge.

5. The method of measuring distortion of telegraph signals which consists in charging two condensers at different rates during the time intervals corresponding to the elements of telegraph signals, combining the charges so that they tend to neutralize each other and determining the magnitude and polarity of the resultant charge.

6. The method of measuring the duration of rapidly recurring electric current impulses which consists in charging a condenser to values of electric charge determined by the lengths of said impulses, charging a second condenser to values of electric charge under the control of the operator, combining said charges after each impulse so that said charges tend to neutralize each other, and determining the magnitude and polarity of the resultant charges.

7. The method of measuring the maximum deviation in length from a given value, of a rapid succession of electric current impulses, which consists in charging a condenser to a value determined by the length of said impulses, charging a second condenser to any desired value, combining said charges, and determining whether the charge on said first condenser is greater or less than that on said second condenser.

In testimony whereof, I have signed my name to this specification this 13th day of November, 1924.

JOSEPH HERMAN.